United States Patent [19]

Onayama et al.

[11] Patent Number: 5,016,954
[45] Date of Patent: May 21, 1991

[54] OPTICAL PICKUP AND HOLOGRAM THEREFOR

[75] Inventors: Shuichi Onayama; Kazuhiko Nosaka, both of Osaka, Japan

[73] Assignee: NEC Home Electronics Ltd., Osaka, Japan

[21] Appl. No.: 446,820

[22] Filed: Jan. 2, 1990

Related U.S. Application Data

[62] Division of Ser. No. 227,330, Aug. 2, 1988, Pat. No. 4,907,847.

[30] Foreign Application Priority Data

Sep. 28, 1987 [JP] Japan .............................. 62-243488
Sep. 28, 1987 [JP] Japan .............................. 62-243489

[51] Int. Cl.$^5$ ............................................. G02B 26/10
[52] U.S. Cl. .................................... 350/3.71; 350/3.7; 350/252; 250/201.1
[58] Field of Search .................. 350/3.7, 3.71, 162.17, 350/172, 252, 3.72, 3.73; 369/101; 250/201.1

[56] References Cited

U.S. PATENT DOCUMENTS 3,671,106  6/1972  Groh ................................. 350/3.73
4,829,506  5/1989  Bressers et al. ................... 350/3.72

FOREIGN PATENT DOCUMENTS 0123048  10/1984  European Pat. Off. .
0228620  7/1987  European Pat. Off. .
0305169  3/1989  European Pat. Off. .

OTHER PUBLICATIONS

"Formation of Optical Elements by Holography" by G. T. Sincerbox, *IBM Tech. Discl. Bulletin*, vol. 10, #3, Aug. 1967.

*Primary Examiner*—Bruce Y. Arnold
*Assistant Examiner*—J. P. Ryan
*Attorney, Agent, or Firm*—Cushman, Darby & Cushman

[57] ABSTRACT

An optical pickup for picking up signals from an optical disk comprises a hologram to split a laser beam emitted from a laser light source into one 0th diffraction light beam and two 1st diffraction light beams, and also to diffract return light beams reflected from the optical disk with two grating areas formed on one surface thereof. The diffracted light beams from the hologram are detected by a 6-piece-divided photodetector. The number of parts included in the system has been greatly reduced.

4 Claims, 3 Drawing Sheets

OPTICAL PICKUP AND HOLOGRAM THEREFOR

This is a division of application Ser. No. 07/227,330, filed Aug. 2, 1988, now U.S. Pat. No. 4,907,847.

BACKGROUND OF THE INVENTION

The present invention relates to a three-beam-type optical pickup and a hologram which is suitable for use in this type of optical pickup.

FIG. 1 shows a constitution of a conventional three-beam-type optical pickup. In this figure, a laser light beam emitted from a laser diode 1 is split into three beams through diffraction by a diffraction grating 2, and split light beams pass through a non-polarizing beam splitter 3 and a collimator lens 4. Light beams which were made into parallel beams by the collimator lens 4, are focused by an object lens 5 so as to form light spots on a signal surface of a disk 6. Return light beams reflected by the disk signal surface return to the beam splitter 3 through the same light paths as their incident paths, are reflected by the beam splitter 3 to the direction of a detector 9, and pass through a plano-concave lens 7 and a cylindrical lens 8. The return light beams transmitted from the cylindrical lens 8 form spots on a 6-piece-divided photodetector 9. Shapes of the spots on the 6-piece-divided photodetector 9 are also illustrated in FIG. 1 for three cases (a), (b) and (c) in which the disk signal surface is just in the focusing plane, the optical pickup is too near to the signal surface, and the optical pickup is too far from the signal surface, respectively.

In this case, a focusing error signal (F.E.), a tracking error signal (T.E.), and a reproduced RF signal (R.F.) are expressed as the following respective equations:

F.E.=(A+C)−(B+D)
T.E.=E−F
R.F.=A+B+C+D where A to F represent outputs from respective photosensors of the 6-piece-divided photodetector 9. Detecting methods of the above focusing error and the tracking error include an astigmatism method and a three beams method, respectively.

The foregoing conventional three-beam-type optical pickup necessitate eight devices: the laser diode 1, the diffraction grating 2, the beam splitter 3, the collimator lens 4, the object lens 5, the plano-concave lens 7, the cylindrical lens 8, and the 6-piece-divided photodetector 9. As these many optical devices are necessary, the conventional three-beam-type optical pickup is costly, it is not easy for the pickup to be miniaturized and made light, and it is complicated to adjust the pickup because of many adjusting points.

Moreover, though there exists a hologram having two grating areas which are constituted in such a manner that diffraction light beams from the hologram are focused on different two points, the two grating areas are formed on one surface of the hologram.

SUMMARY OF THE INVENTION

Accordingly, an object of the invention is to provide an optical pickup in which the optical system can be simplified, the cost can be reduced, the optical pickup itself can be miniaturized and made light, and the adjustment operation can be simplified.

Another object of the invention is to provide a hologram which is also used for a purpose other than the three-beam-type optical pickup.

An optical pickup of the first embodiment according to the present invention has a constitution which comprises: a diffraction grating for splitting a laser light beam emitted from a laser light source into three light beams; a hologram which is placed in front of the diffraction grating and comprises two areas in such a manner that each of diffracted light beams therefrom is focused on two different points; and a 6-piece-divided photodetector placed in the direction of diffraction by the hologram of return light beams which transmitted the hologram, passed through an object lens, and were reflected by a disk signal surface.

A hologram according to the invention has a structure in which one surface is equipped with a hologram surface having two areas in such a manner that each diffraction beam is focused on two different points, and the other surface is equipped with a diffraction grating for splitting a light beam into three light beams.

This hologram is used in an optical pickup of the second embodiment of the invention, where the hologram splits a laser light beam emitted from a laser light source into three light beams and diffracts return light beams reflected from a disk signal surface after passing through an object lens to a prescribed direction so that diffracted return light beams are detected by a 6-piece-divided photodetector disposed in the diffraction direction.

Other and further objects, features and advantages will appear more fully from the following description taken in connection with the accompanying drawings.

DETAILED DESCRIPTION OF THE PREFERRED INVENTION

Figure 2:
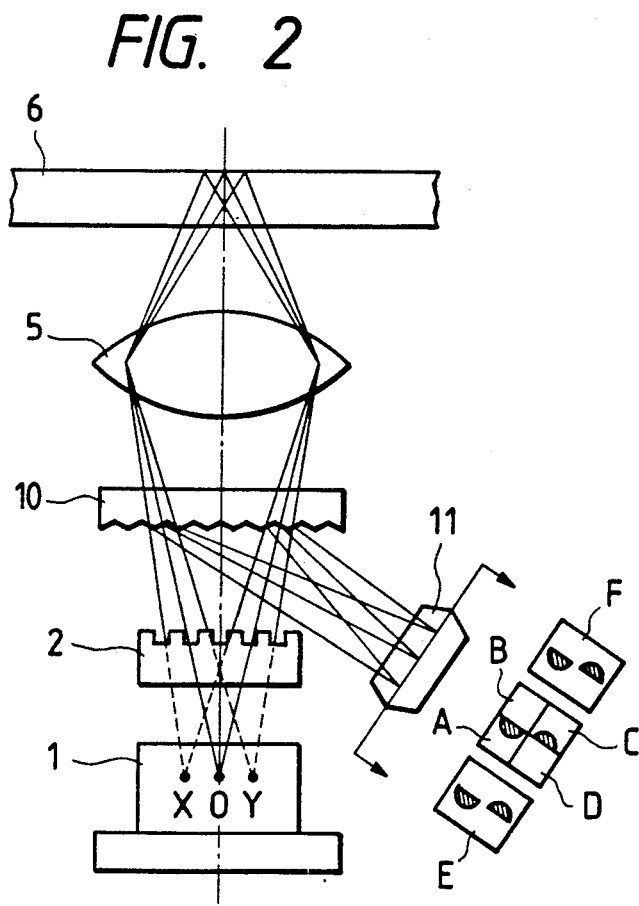
FIG. 2 illustrates a constitution of an optical pickup according to the first embodiment of the invention.
Figure 3A:
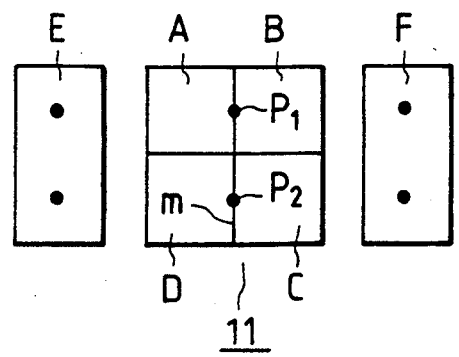
FIGS. 3 (a), (b) and (c) illustrate the principle of detection in a 6-piece-divided photodetector.
Figure 3B:
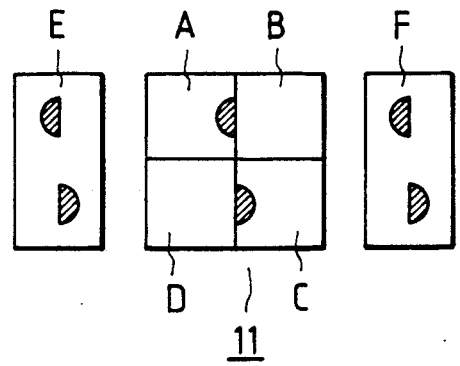
Figure 3C:
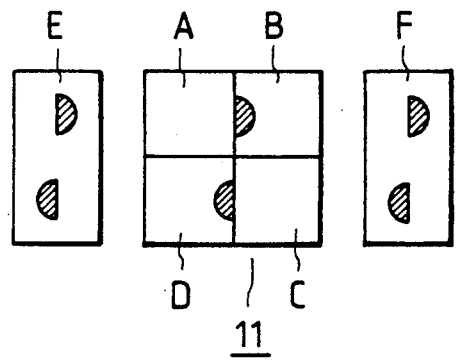
Figure 4:
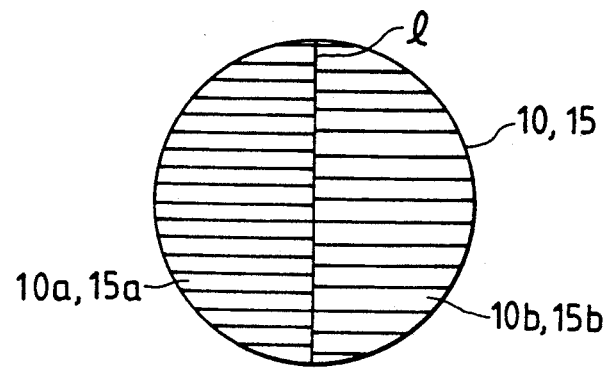
FIG. 4 illustrates one surface of a hologram.

The first embodiment of an optical pickup according to the present invention will be described in the following with reference to FIG. 2 to FIG. 4. In FIG. 2 a laser diode 1, a diffraction grating 2, and an object lens 5 are the same as those in the conventional optical pickup. A hologram 10 which diffracts return light beams returned from a disk signal surface to the prescribed direction, is placed between the diffraction grating 2 and the object lens 5. A 6-piece-divided photodetector 11 is placed in the direction of the light diffraction by the hologram 10. The 6-piece-divided photodetector 11 comprises a 4-piece-divided photosensor having four photosensors A, B, C, and D, and a 2-piece-divided photosensor having photosensors E and F disposed at the outside as shown in FIG. 2, which is the same constitution as the conventional one. One surface of the hologram 10 is divided into two areas labeled 10a and 10b with different grating pitches from each other as shown in FIG. 4. The two areas 10a and 10b have such respective grating patterns that 1st diffraction light beams from these gratings are focused on $P_1$ and $P_2$ on the 4-piece-divided photosensor, respectively. A boundary line l between these areas is in the direction perpendicular to the paper surface in FIG. 2. The boundary line l and a dividing line m in the 6-piece-divided photodetector 11 are parallel to each other. Moreover, a distance between the hologram 10 and the laser diode 1 is equal to that between the hologram 10 and the 6-piece-divided photodetector (in both cases, center to center distance). In FIG. 2, the three light beams split by the diffraction grating 2 are expressed as three light beams emitted from an actual light source O and virtual light sources X and Y. That is, a light path from the actual light source represents a 0th light beam through the diffraction grating 2, and light paths from the virtual light sources X and Y represent 1st diffraction light beams.

In the optical pickup with the foregoing constitution, a light beam emitted from the laser diode 1 is split by the diffraction grating 2 into three light beams, and the split three light beams are transmitted through the hologram 10, are focused by the object lens 5, and form on the signal surface three respective light spots consisting of one main spot and two sub-spots. The return light beams reflected from the disk signal surface pass the object lens 5 and are made incident on the hologram 10, along the same paths as those before reaching the signal surface. The return light beams are diffracted by the hologram 10. The 1st diffraction light beam from the hologram 10 go toward the 6-piece-divided photodetector 11 and form light spots on the 6-piece-divided photodetector 11. The return light beam from the main spot irradiates photosensors A, B, C and D of the 4-piece-divided photosensor. The the return light beams from the sub-spots irradiate photosensors E and F of the 2-piece-divided photosensor. Each return light beam forms two spots corresponding to two areas 10a and 10b of the hologram 10 (top and bottom spots such as $P_1$ and $P_2$ in FIG. 3 (a). When the light beams are just focused on the disk signal surface, the light spots on the 6-piece-divided photodetector 11 become like those shown in FIG. 3(a). When the optical pickup is too near to the disk signal surface and too far from that, the light spots become like those shown in FIG. 3(b) and FIG. 3(c), respectively. Therefore, a focusing error signal (F.E.), a tracking error signal (T.E.), and a reproduced RF signal (R.F.) are expressed as following respective equations:

$F.E. = (A+C) - (B+D)$
$T.E. = E - F$
$R.F. = A + B + C + D$ where A to F represent outputs from the corresponding photosensors. A foregoing focusing-error detection method is, in a word, a double-knife-edge method, and a tracking-error detection method, a three beams method.

As the four optical devices of the beam splitter 3, the collimator lens 4, the plano-concave lens 7, and the cylindrical lens 8 in the conventional optical pickup are replaced by the one hologram 10 in the invention, the number of included parts has been greatly reduced with the invention. Therefore, the cost can be reduced, the miniaturization of system can be easily attained, and the number of adjusting processes can be reduced because of the decrease of the adjusting points. Moreover, the "playability", that is, the capability to correctly read out signals recorded on the disk, of the pickup of the invention is at least the same as the conventional optical pickup.

Figure 1:
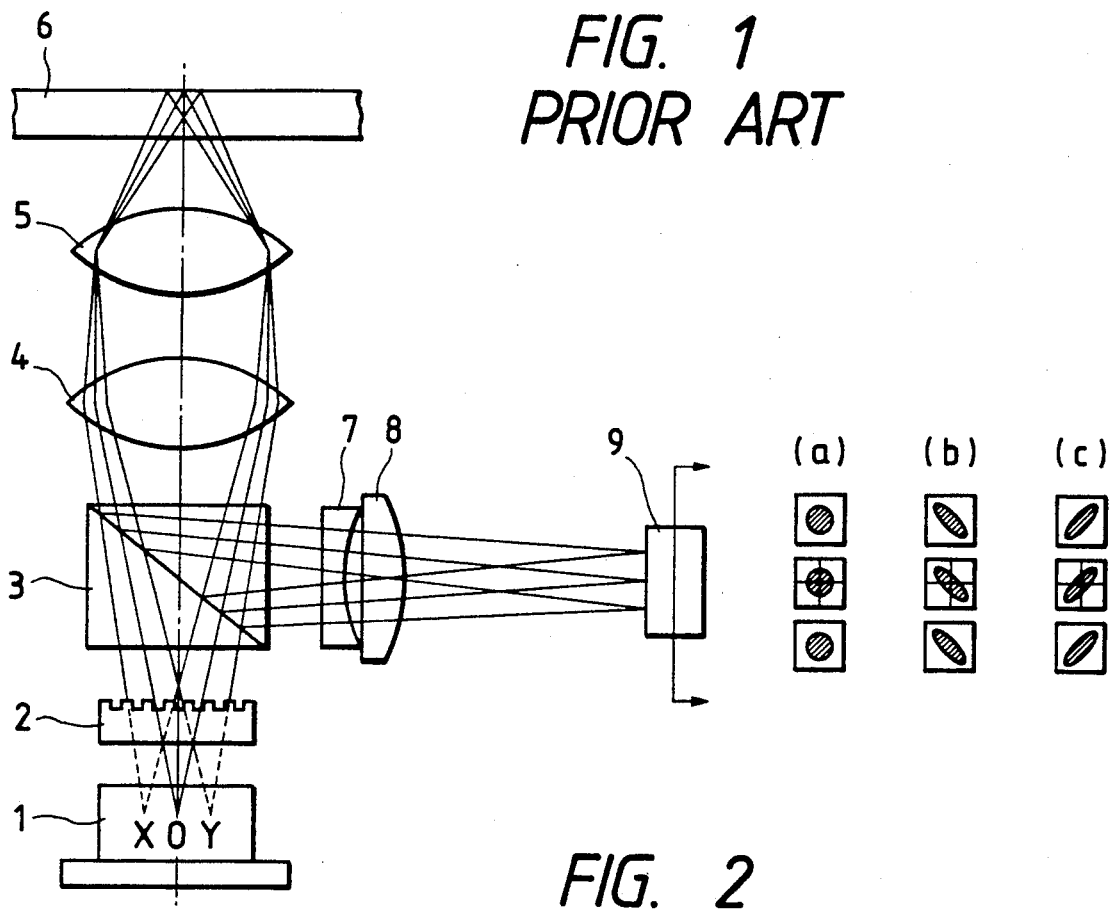
FIG. 1 illustrates a constitution of a conventional optical pickup.
Figure 5:
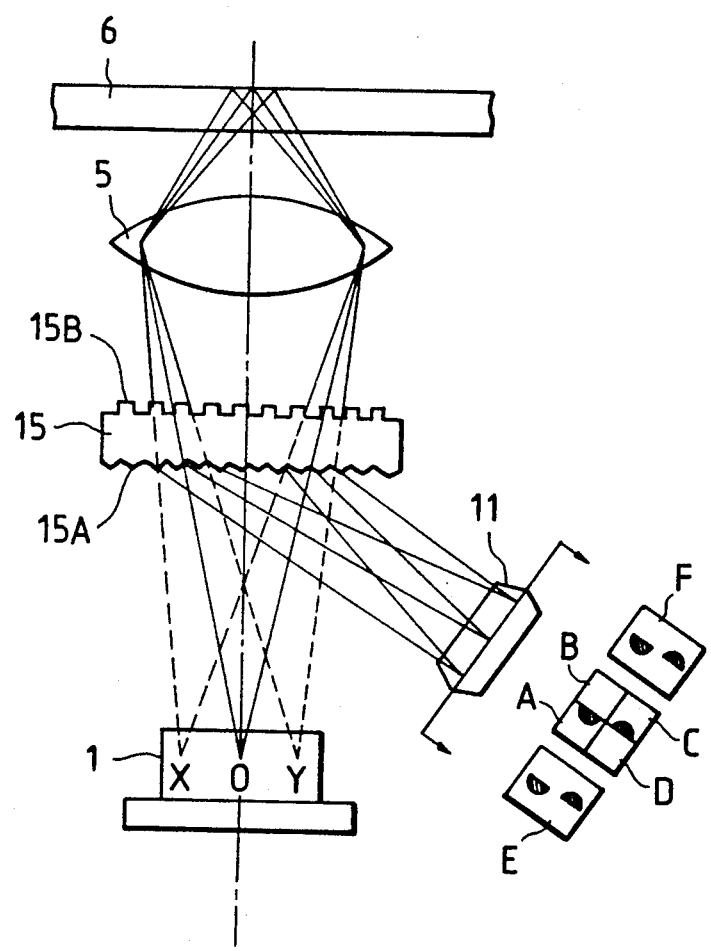
FIG. 5 illustrates a constitution of an optical pickup according to the second embodiment of the invention, where a hologram of this invention is employed.

The second embodiment of an optical pickup in which a hologram of the present invention is applied, is shown in FIG. 5. In FIG. 5, a laser diode 1 and an object lens 5 is the same as the conventional optical pickup shown in FIG. 1. The reference numeral 15 indicates a hologram of the invention. The hologram 15 is disposed between the laser diode 1 and the object lens 5, and a 6-piece-divided photodetector 11 is disposed in the direction of the 1st diffraction light beams of return light beams from a disk signal surface, which are diffracted by the hologram 15. The 6-piece-divided photodetector 11 comprises 4-piece-divided photosensor having four photosensors A, B, C, and D, and a 2-piece-divided photosensor having photosensors E and F disposed at the outsides as shown in FIG. 3, which is the same constitution as the conventional one.

One surface of the hologram 15 facing the laser diode 1 is made to be a hologram surface 15A, and the hologram surface 15A is divided into two areas 15a and 15b with different grating pitches from each other as shown in FIG. 4. The two areas 15a and 15b have such respective grating patterns that the 1st diffraction beams from these gratings are focused on $P_1$ and $P_2$ on 4-piece-divided piece-divided photosensor, respectively (refer to FIG. 3). And a boundary line l between these areas is in the direction perpendicular to the paper surface in FIG. 5. The boundary line l and a dividing line m in the 6-piece-divided photodetector 11 are parallel to each other. The other surface of the hologram 15 facing the object lens 5 has a parallel linear grating with a uniform pitch, and is made to be a mere diffraction grating surface 15B for splitting a laser light beam into three light beams through diffraction. Moreover, a distance between the hologram 15 and the laser diode 1 is equal to that between the hologram 15 and the 6-piece-divided photodetector 11 (in both cases, center to center distance). In FIG. 5, the three light beams split by the diffraction grating surface 15B of the hologram 15 are expressed as three light beams emitted from an actual light source O and virtual light sources X and Y. That is, a light path from the actual light source represents a 0th light beam through the diffraction grating surface 15B, and light paths from the virtual light sources X and Y represent 1st diffraction light beams by the diffraction grating surface 15B.

In the optical pickup with the foregoing constitution, the laser light beam emitted from the laser diode 1 is split by the diffraction grating surface 15B of the hologram 15 into the three light beams when passing through the hologram 15, and the split three beams are focused by the object lens 5 so as to form three respective light spots consisting of one main spot and two sub-spots on the signal surface of the optical disk 6. The return light beams reflected from the disk signal surface pass the object lens 5, are again made incident on the hologram 15, along the same paths as those before reaching the signal surface, and are diffracted by the hologram surface 15A of the hologram 15. First diffraction light beams of the return light beams diffracted by the hologram surface 15A go toward the 6-piece-divided photodetector 11, and form light spots on the 6-piece-divided photodetector 11. The return light beam from the main spot irradiates photosensors A, B, C and D of the 4-piece-divided photosensor. And the return light beams from the sub-spots irradiate photosensors E and F of the 2-piece-divided photosensor. Each return light beam forms two spots corresponding to two areas 15a and 15b of the hologram 15 (top and bottom spots such as $P_1$ and $P_2$ in FIG. 3). When the light beams are just focused on the disk signal plane, the light spots on the 6-piece-divided photodetector 11 become like those shown in FIG. 3(a). When the optical pickup is too near to the disk signal surface and too far from that, the light spots become like those shown in FIG. 3(b) and FIG. 3(c), respectively. Therefore, a focusing error signal (F.E.), a tracking error signal (T.E.), and a reproduced RF signal (R.F.) are expressed as following respective equations:

F.E.=(A+C)−(B+D)
T.E.=E−F
R.F.=A+B+C+D−(E+F)/K where A to F represent outputs from the corresponding photosensors and K means a constant which is determined from diffraction efficiency of the diffraction grating surface 15B. A foregoing focusing-error detection method is, in a word, a double-knife-edge method, and a tracking-error detection method, a three beams method.

As described in the foregoing, the hologram 15 according to the invention is a very useful optical device having, in one piece of plate, the function of the diffraction grating for splitting the laser light beam into the three light beams and the function for diffracting the light beams in such a manner that each 1st diffraction light beam is focused on two different points. Actually, the hologram surface 15A and the diffraction grating surface 15B of the hologram 15 diffract both of the incident and return light beams. The hologram of the above embodiment utilizes the diffracting operation of the diffraction grating surface 15B for the incident light beams, and that of the hologram surface for the return light beams.

In the second embodiment of the optical pickup, the five optical devices of the diffraction grating 2, the collimator lens 4, the beam splitter 3, the plano-concave lens 7, and the cylindrical lens 8 in the conventional optical pickup are replaced by the one hologram 15.

Therefore, the same advantages as in the first embodiment can be obtained in their even greater degrees.

The hologram of the invention can also be used for an optical system other than the optical pickup of the foregoing embodiment, which needs the above-described functions of the diffraction grating surface and the hologram surface.

What is claimed is:

1. An optical pickup for picking up signals from a signal surface of an optical disk, comprising:
    a laser light source for emitting a laser beam;
    splitting means, formed by a diffraction grating, for splitting said laser beam emitted from said laser light source into three light beams;
    an object lens disposed in front of said optical disk, for focusing said three light beams coming from said splitting means on said signal surface of said optical disk;
    diffraction means, formed by a first surface of a hologram, disposed between said splitting means and said object lens, for diffracting return light beams reflected from said signal surface; and
    a 6-piece-divided photodetector disposed in a direction of diffracted return light beams from said diffraction means, for detecting said diffracted return light beams,
    wherein said diffraction grating which forms said splitting means is formed on a second and opposite surface of said hologram.

2. An optical pickup as claimed in claim 1, wherein said first surface of said hologram comprises two diffraction grating areas with different grating pitches in such a manner that each of said diffracted return light beams from said first surface of said hologram is focused on two different points on said 6-piece-divided photodetector.

3. An optical pickup as claimed in claim 1, wherein said 6-piece-divided photodetector comprises a 4-piece-divided photosensor and 2-piece-divided photosensor, two photosensors of said 2-piece-divided photosensor being disposed at respective outsides of said 4-piece-divided photosensor.

4. An optical pickup as claimed in claim 3, wherein one of said diffracted return light beams from said diffraction means originates from a 0th diffraction light beam from said splitting means and irradiates said 4-piece-divided photosensor, and two of said diffraction light beams from said diffraction means originate from 1st diffraction light beams from said splitting means and irradiate said respective photosensors of said 2-piece-divided photosensor.

* * * * *